US009813417B2

(12) United States Patent
Massand

(10) Patent No.: US 9,813,417 B2
(45) Date of Patent: *Nov. 7, 2017

(54) SYSTEMS AND METHODS FOR CREATING AND DISPLAYING AN ELECTRONIC COMMUNICATION DIGEST

(71) Applicant: LITERA CORPORATION, McLeansville, NC (US)

(72) Inventor: Deepak Massand, McLeansville, NC (US)

(73) Assignee: LITERA CORPORATION, McLeansville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,313

(22) Filed: Aug. 24, 2015

(65) Prior Publication Data

US 2015/0365411 A1 Dec. 17, 2015

Related U.S. Application Data

(63) Continuation of application No. 13/654,615, filed on Oct. 18, 2012, now Pat. No. 9,118,613.

(51) Int. Cl.
  G06F 15/16 (2006.01)
  H04L 29/06 (2006.01)
  G06F 17/30 (2006.01)
  G06F 21/10 (2013.01)
  G06Q 10/10 (2012.01)
  H04L 12/58 (2006.01)

(52) U.S. Cl.
  CPC .... *H04L 63/0876* (2013.01); *G06F 17/30156* (2013.01); *G06F 21/10* (2013.01); *G06Q 10/107* (2013.01); *H04L 51/16* (2013.01); *H04L 63/123* (2013.01)

(58) Field of Classification Search
  CPC ... H04L 63/0876; H04L 63/123; H04L 51/16; G06Q 10/107
  USPC .......... 709/206, 203, 202; 341/50, 59; 726/4
  See application file for complete search history.

(56) References Cited

U.S. PATENT DOCUMENTS 6,816,884 B1 * 11/2004 Summers ............. G06Q 10/107
  709/202
7,912,904 B2   3/2011 Buchheit et al.
8,299,944 B2 * 10/2012 Provenzano ...... G06F 17/30156
  341/50

(Continued)

*Primary Examiner* — Kyung H Shin
(74) *Attorney, Agent, or Firm* — Finnegan, Henderson, Farabow, Garrett & Dunner LLP

(57) ABSTRACT

Systems and methods are disclosed for creating an electronic communication digest. In one implementation, a system receives a first electronic communication including first content, and generates an electronic communication digest that reflects the first electronic communication by including first digest content generated based on the first content. The system receives a second electronic communication that includes second content, and determines a repeated portion of the second content that is included in the first content and a unique portion of the second content that is unique to the first content. The system also update the electronic communication digest to reflect the second electronic communication by adding second digest content generated that includes the unique portion of the content and does not include the repeated portion of the second content.

25 Claims, 9 Drawing Sheets

(56) References Cited

U.S. PATENT DOCUMENTS

2003/0135653 A1 7/2003 Marovich
2013/0174223 A1* 7/2013 Dykeman ............... G06F 21/10
726/4

* cited by examiner

200

From: Recipient1
Sent: Wednesday, Oct. 03, 2012 9:22 PM  } 220
To: Sender; Recipient2
Subject: Features B and C 212 {
To add on to this, part of the code we have written also includes
features B and C, which will also be helpful to the project. We  } 221
can discuss in greater detail at our next meeting.

From: Recipient2
Sent: Tuesday, Oct. 03, 2012 4:53 PM  } 224
To: Sender; Recipient1
Subject: RE: Project X 211 {
Recipient1 and I have written software code to
implement a new feature, Feature A. We are in the  } 225
process of testing and troubleshooting the code right
now.

222 {
From: Sender
Sent: Tuesday, Oct. 02, 2012 12:46 PM
To: Recipient1; Recipient2
Subject: Project X Hi everyone, 223 {
I would like to start documenting our ideas on
Project X. Can you please send me the work  } 210
you have done on this since our last meeting?

Thanks,
Sender

201

From: Recipient2
Sent: Wednesday, Oct. 03, 2012 4:18 PM
To: Sender; Recipient1
Subject: RE: Project X 214 {
I have begun conducting a preliminary analysis. The work I
have done so far is attached. I would appreciate any
feedback or comments.

From: Recipient1
Sent: Tuesday, Oct. 02, 2012 12:53 PM
To: Sender; Recipient2
Subject: RE: Project X 213 {
During the meeting, we discussed conducting a
market analysis on the final product that Project X
will produce. Has anyone looked into this any
further?

From: Sender
Sent: Tuesday, Oct. 02, 2012 12:46 PM
To: Recipient1; Recipient2
Subject: Project X Hi everyone, I would like to start documenting our ideas
on Project X. Can you please send me the  } 210
work you have done on this since our last
meeting Thanks,
Sender

410 {
422 — F: S; T: R1, R2; S: 10/02/12 12:46P
423 — I would like to start documenting our ideas on Project X. Can you please send me the work you have done on this since our last meeting?
}

413 {
F: R1; T: S, R2; S: 10/02/12 12:53 PM
During the meeting, we discussed conducting a market analysis on the final product that Project X will produce. Has anyone looked into this any further?
}

414 {
F: R2; T: S, R1; S: 10/03/12 4:18P
I have begun conducting a preliminary analysis. The work I have done so far is attached. I would appreciate any feedback or comments.
}

411 {
F: R2; T: S, R1; S: 10/03/12 4:53P
Recipient1 and I have written software code to implement a new feature, Feature A. We are in the process of testing and troubleshooting the code right now.
} 425

412 {
F: R1; T: S, R1; S: 10/3/12 9:22P
Part of code written includes features B and C, also helpful to project. Discuss greater detail next meeting.
} 421

FIG. 4

SYSTEMS AND METHODS FOR CREATING AND DISPLAYING AN ELECTRONIC COMMUNICATION DIGEST

This application is a continuation of U.S. application Ser. No. 13/654,615, filed on Oct. 18, 2012. The contents of this priority application is incorporated herein by reference in its entirety.

TECHNICAL FIELD

This disclosure generally relates to the creation and display of an electronic communication digest and, more particularly, to methods and systems for identifying, organizing, and displaying content obtained from a stream of electronic communications.

BACKGROUND

Electronic communication via mediums such as e-mail, electronic messaging, group multimedia messaging, forum posting, etc., has become ubiquitous in the work place and personal lives of many people. Using e-mail as an example, it is not uncommon for a person to receive more than one hundred e-mail messages each day. Tools that help a person organize and locate received messages have been developed to ease the burden created by the sheer volume of electronic communications. Such tools allow a user to create folders to organize related e-mails, sort the e-mails by subject or by sender, and create queries to find messages that match the query.

However, these conventional tools are cumbersome and time consuming to use, and cannot comprehensively group related e-mails together so that a user can easily understand the various ideas contained in the group of e-mails. For example, tools that allow a user to move received e-mails to folders are cumbersome to use and prone to errors because the e-mails can be moved to the wrong folder. Similarly, tools that allow a user to search received e-mails based on queries using subject line, date, and sender can be difficult to write and may not successfully identify related messages when, for example, the subject line changes or when unrelated messages have the same subject line. Furthermore, conventional tools do not offer a way of determining the main ideas presented in an e-mail stream, how they are related to one another, and who authored them.

SUMMARY

Disclosed embodiments provide computer-based electronic communication digest systems and methods that enable the identification of related electronic messages, regardless of changes in the subject line, authorship, etc., and offer a unique display of the ideas and information contained within the group of messages. Certain disclosed embodiments include a system for creating an electronic communication digest. In one aspect, the system includes a processor and a memory. The memory may include instructions that cause the processor to receive a first electronic communication including first content, and generate an electronic communication digest that reflects the first electronic communication by including first digest content generated based on the first content. The memory may also include instructions that cause the processor to receive a second electronic communication that includes second content, and determine a repeated portion of the second content that is included in the first content and a unique portion of the second content that is unique to the first content. The memory may further include instructions that cause the processor to update the electronic communication digest to reflect the second electronic communication by adding second digest content that includes the unique portion of the content and does not include the repeated portion of the second content.

Consistent with disclosed embodiments, a method is provided for creating an electronic communication digest. In one aspect, the method includes receiving a first electronic communication including first content, and generating an electronic communication digest that reflects the first electronic communication by including first digest content generated based on the first content. The method also includes receiving a second electronic communication that includes second content, and determining a repeated portion of the second content that is included in the first content and a unique portion of the second content that is unique to the first content. The method also includes updating the electronic communication digest to reflect the second electronic communication by adding second digest content that includes the unique portion of the content and does not include the repeated portion of the second content.

In certain embodiments, the system for creating the electronic communication digest may determine that electronic communications are related to each other by reference to a unique identifier. This unique identifier may be provided by the electronic communications software, such as the e-mail software, or may be provided by the system for creating the electronic communication digest. The system may display the electronic communication digest and receive a command to perform an action, e.g., move, copy, delete, archive, etc., on electronic communications represented by the digest. Responsive to receiving the command, the system may perform the command on the electronic communications represented by the digest. This way, for example, the system can managed all related electronic communications, e.g., all communications with the same unique identifier, responsive to a single command.

Consistent with other disclosed embodiments, tangible computer-readable storage media may store program instructions that are executable by a processor to implement one or more of the methods disclosed herein.

The foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain disclosed principles of creating and displaying an electronic communication digest. In the drawings:

FIG. 2 shows exemplary e-mail streams that may be communicated using the system of FIG. 1, consistent with disclosed embodiments;

FIG. 4 shows an exemplary electronic communication digest, consistent with disclosed embodiments;

DESCRIPTION OF THE EMBODIMENTS

The disclosed embodiments may generate an electronic communication digest that may enable a user to more easily review and comprehend the content within a stream of related electronic communications. The electronic communication digest may be a distillation or summary of the unique content within those related electronic communications. Certain disclosed embodiments also generate data for presenting the electronic communication digest in a graphical format. Other embodiments may provide processes that, when executed by a processor, enable a user to enter commands to be performed on one or more electronic communications that are represented by the electronic communication digest, e.g., with a single command.

In one embodiment, electronic communications may include, but are not limited to, e-mail, electronic text and/or multimedia messages, group multimedia messages, and forum posts. In some of the disclosed exemplary embodiments, e-mail is used as an example of an electronic communication. Those skilled in the art will appreciate, however, that the embodiments described herein are applicable to any form of electronic communication and are not limited to e-mail.

Reference will now be made in detail to exemplary embodiments, examples of which are illustrated in the accompanying drawings. Wherever convenient, the same reference numbers will be used throughout the drawings to refer to the same or like parts.

Figure 1:
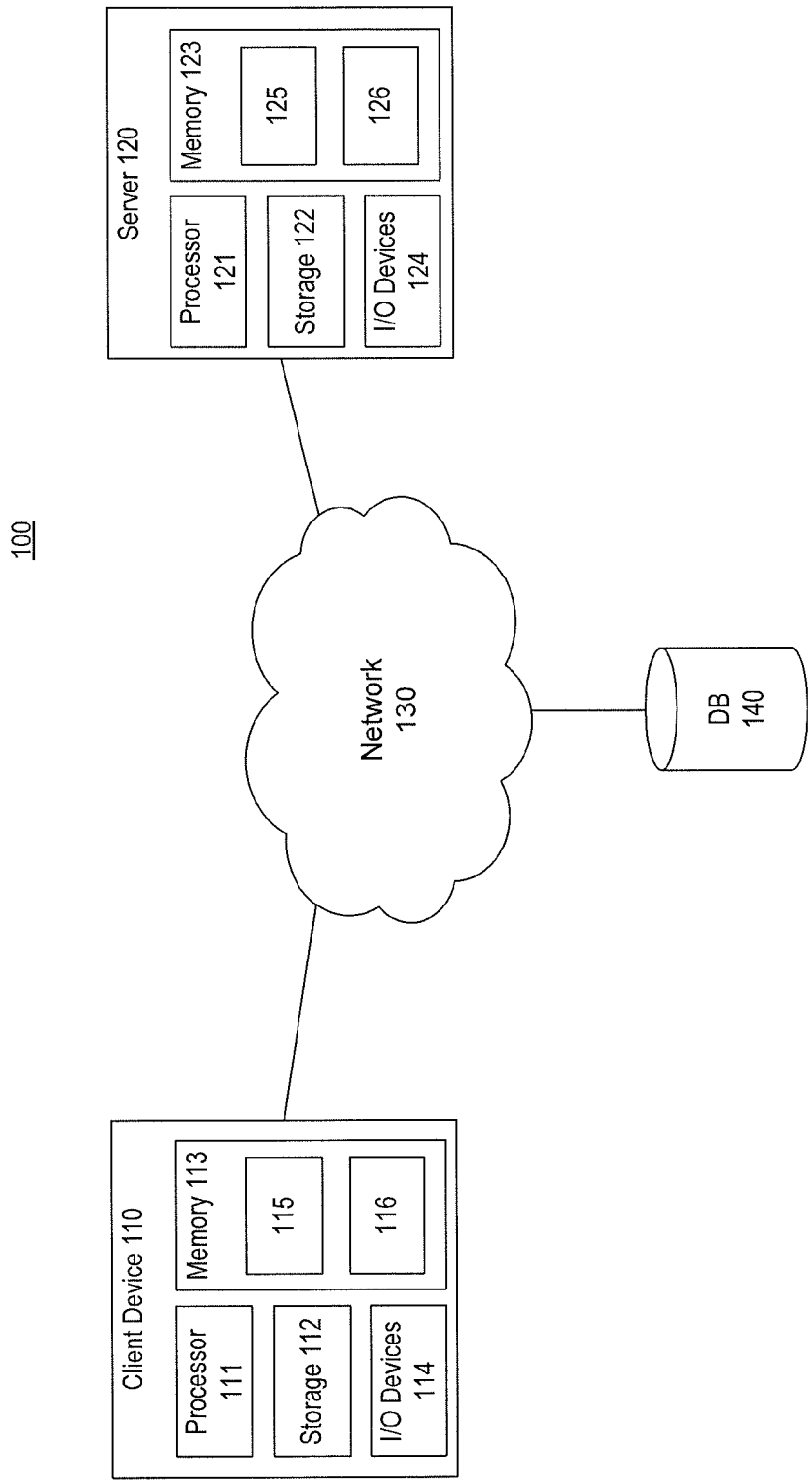
FIG. 1 is a diagram of exemplary system components that may be used to implement disclosed embodiments.

FIG. 1 is a diagram of an exemplary system 100 that may be used to implement one or more disclosed embodiments. In accordance with certain disclosed embodiments, system 100 may include a client device 110, a server 120, and a database 140 connected via a network 130. However, the components and arrangement of system 100 may vary, and are not limited to that illustrated in FIG. 1. For example, while only one of each component 110, 120, and 140 is shown in FIG. 1, those skilled in the art will appreciate that system 100 may include any number of client devices 110, servers 120, and databases 140 connected to network 130.

Client device 110 may be a general purpose or notebook computer, a mobile device, a tablet computer, a smart phone, or any other type of computing device or combination of computing devices and/or affiliated components. Server 120 may be a server for storing and serving electronic communications, such as e-mail, text and/or multimedia messages, forum postings, etc. Client device 110 may communicate with server 120 to receive electronic communications that may have been received by server 120, e.g., from client devices connected to network 130. Using e-mail as an example, client device 110 may retrieve e-mail communications from server 120 for display to a user at client device 110 and/or may send e-mail communications to server 120 for distribution to other client devices. In certain embodiments, client device 110 may include a client-side e-mail application, such as Microsoft Outlook®, or any other client-side e-mail application, for displaying e-mails. In some embodiments, server 120 may host a server-based e-mail application, such as Gmail™, and client device 110 may display e-mail to a user via an interface, such as a web browser, of client device 110.

Client device 110 may include a processor 111, a storage 112, a memory 113, and input/output (I/O) devices 114. In one embodiment, memory 113 may include an electronic communication digest generation program 115 and one or more other programs 116. Other programs 116 may include, for example, one or more of a client-based e-mail application, a web browser, or other applications. In one embodiment, electronic communication digest generation program 115 may be a stand-alone application or may be incorporated into one or more other programs 116, e.g., as an add-on. For example, in embodiments where other programs 116 include a client-based e-mail application, electronic communication digest generation program 115 may be provided as an add-on feature to the client-based e-mail application. Electronic communication digest generation program 115 may reside in memory 113, and may be loaded from storage 112 or from other external tangible storage medium (not shown) through I/O devices 114. Instructions in electronic communication digest generation program 115 may be executed by one or more processors, such as processor 111, to perform features consistent with one or more disclosed embodiments.

I/O devices 114 may comprise one or more input devices and one or more output devices that allow data to be received and/or transmitted by client device 110. For example, I/O devices 114 may include one or more input devices, such as a keyboard, a touch screen, a mouse, a microphone, and the like, that enable client device 110 to receive data from a user. Further, client device may include I/O devices 114 that communicate with one or more output devices, such as a display screen, a CRT monitor, an LCD monitor, a plasma display, a printer, and speaker devices, that enable client device 110 to present data, such as electronic communications and/or an electronic communications digest, to a user. I/O devices 114 may also include one or more digital and/or analog communication input/output devices that allow client device 110 to communicate with other machines and devices, including other machines and devices connected to network 130. The configuration and number of input and/or output devices incorporated in I/O devices 114 may vary as appropriate for certain embodiments.

Server 120 may include a processor 121, a storage 122, a memory 123, and input/output (I/O) devices 124. In one embodiment, memory 123 may include an electronic communication digest generation program 125 and one or more other programs 126. Other programs 126 may include, for example, one or more programs that enable server 120 to function as a server such, as an e-mail server, host server-based e-mail applications displayable on browsers of client devices, etc. Electronic communication digest generation program 125 may reside in memory 123, and may be loaded from storage 122 or from other external tangible storage medium (not shown) through I/O devices 124. Instructions in electronic communication digest generation program 125 may be executed by one or more processors, such as processor 121, to perform operations and processes consistent with one or more disclosed embodiments.

Aspects of the disclosed embodiments provide one or more electronic communication digests. In certain embodiments, electronic communication digest generation programs 115 and 125 may individually or collectively provide and generate such communication digests. Programs 115 and 125 may each include instructions, which when executed by a processor, perform one or more processes that generate, maintain, and/or provide electronic communication digests. In some embodiments, this functionality may be included exclusively at client device 110. For example, server 120 may be configured to operate as a web server that receives outgoing e-mails from client device 110 and sends incoming e-mails to client device 110. Client device 110 may include electronic communication digest generation program 115, e.g., as an add-on to a client-based e-mail application or as a separate program that works in conjunction with a client-based e-mail application. In other embodiments, this functionality may be included exclusively at server 120. For example, server 120 may include a web-based e-mail application accessible through a browser of client device 110. In these embodiments, server 120 may include electronic communication digest generation program 125 which may be executed at server 120 to perform features consistent with disclosed embodiments. Program 125 may generate content that may be provided to client 110 for display. In still other embodiments, the functionality of an electronic communication digest generation program may be distributed across client device 110 and server 120. For simplicity, the remainder of the disclosure describes aspects of the disclosed embodiments in connection with electronic communication digest generation program 115 which is executed by processor 111 of client device 110. Those skilled in the art, however, will appreciate that similar features may be implemented by executing electronic communication digest generation program 125 at server 120 and/or in a distributed fashion by executing both electronic communication digest generation programs 115 and 125.

Processors 111 and 121 may be one or more known or later created processing devices, such as a microprocessor from the Pentium™ family manufactured by Intel™ or the Turion™ family manufactured by AMD™. Memories 113 and 123 may be one or more storage devices configured to store information used by processors 111 and 121, respectively, to perform certain functions related to disclosed embodiments. Storage 112 and 122 may be a volatile or non-volatile, magnetic, semiconductor, tape, optical, removable, nonremovable, or other type of storage device or tangible computer-readable medium.

Client device 110 and/or server 120 may also be communicatively connected to one or more databases 140 locally or through network 130. Databases 140 may store information and may be accessed and/or managed through system 100. By way of example, databases 140 may be MYSQL, Microsoft Access or SQL databases, SharePoint databases, Oracle™ databases, Sybase™ databases, or other databases. Databases 140 may include computing devices (e.g., processors) that execute software to work with database devices. Databases 140 may include, for example, data and information related to settings used by client device 110 and/or server 120 to generate electronic communication digests. Systems and methods of disclosed embodiments, however, are not limited to separate databases or even to the use of a database.

Network 130 may include any one of or combination of wired or wireless networks. Network 130 may include, for example, a local area network, wide area network, campus area network, or the Internet.

FIG. 2 shows exemplary e-mail stream 200 and 201 that may be sent and received using the system of FIG. 1, consistent with disclosed embodiments. For example, e-mail streams 200 and 201 both originate from the same e-mail 210 that "Sender" sent, e.g., via client device 110 in FIG. 1, to "Recipient1" and "Recipient2." Recipient1 and Recipient2 may thus receive e-mail 210 from server 120 via their own client devices connected to network 130. For example, as shown in FIG. 2, e-mail 210 requests information related to additional work that Recipient1 and Recipient2 have done on a project.

E-mail streams 200 and 201 have related content, in the sense that they are both in reply to the initial e-mail 210. They develop along separate and independent timelines, however, as shown in FIG. 2. For example, in e-mail stream 200, Recipient2 first replies with e-mail 211, providing information about software code to implement a new feature related to the project. Later, Recipient1 replies to Recipient2's e-mail 211 with e-mail 212, providing additional information regarding other features that are also implemented via the software code, to supplement the information included in e-mail 211. In e-mail stream 201, Recipient1 first replies with e-mail 213, posing a question regarding a market analysis discussed during a meeting. Then, Recipient2 replies to Recipient1's e-mail 213 with e-mail 214, providing information regarding the market analysis discussed in e-mail 213.

Even though the content in e-mails 210-214 are related to each other, the e-mails may be received by client device 110 at different times and in a manner that makes distilling and comprehending the content difficult for Sender. For example, over 30 hours has elapsed between the first reply, e-mail 213, and the last reply, e-mail 212. Between that time, Sender may have received hundreds of e-mails. This problem may be exacerbated if e-mail streams 200 and 201 continue for additional time, as even more unrelated e-mails will fill Sender's inbox, making it more difficult to find and sort through the related e-mails. Moreover, as shown in header 220 of e-mail 212, Recipient 1 changed the subject of e-mail 212. Thus, even if Sender were to sort the e-mail inbox by subject, Sender would not be able to easily find e-mail 212, because it has a different subject than the rest of the e-mails.

Additionally, when Sender receives an e-mail, such as e-mail 212, Sender may receive all of the content that was previously included in e-mail stream 200. For example, when receiving e-mail 212, Sender may also receive the content of e-mails 211 and 210, e.g., following the content of e-mail 212. For long e-mail streams, it may become burdensome for Sender to read through the stream of e-mails, even though the only new content in the entire e-mail is content 221, as shown in FIG. 2.

Figure 3:
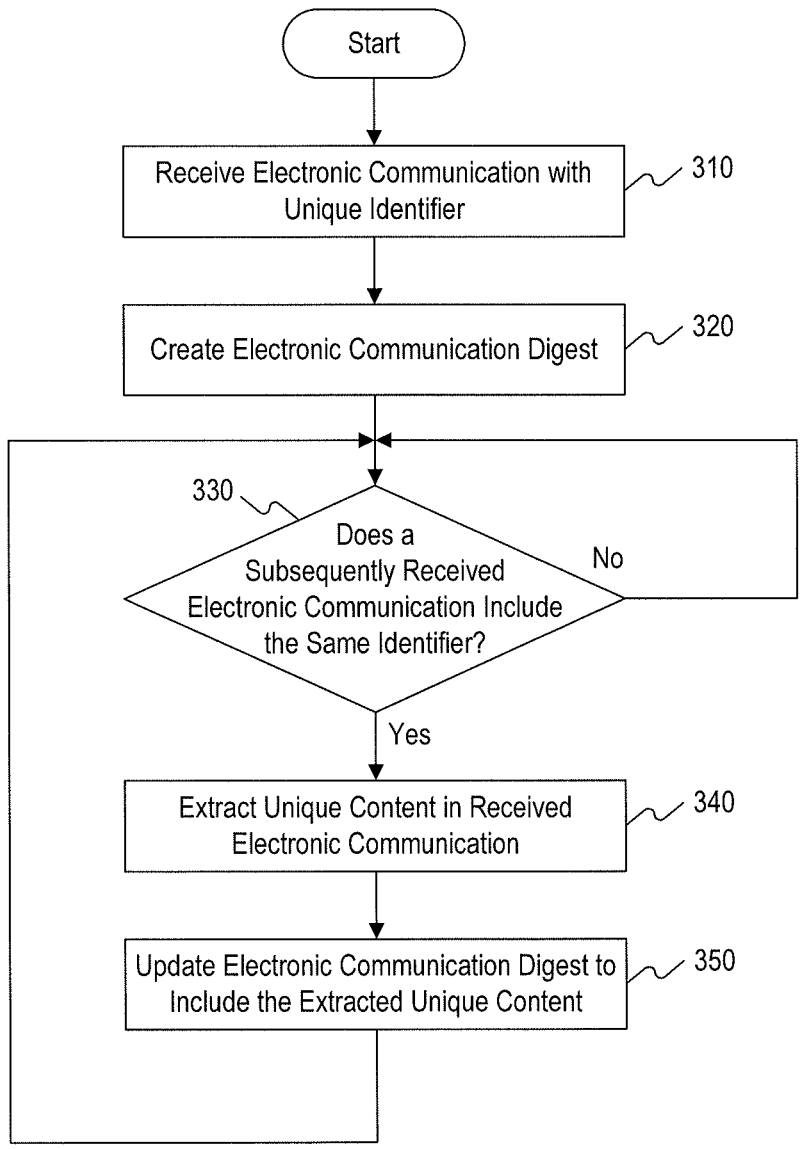
FIG. 3 is a flow diagram illustrating an exemplary electronic communication digest generation process that may be performed by one or more components of the system of FIG. 1, consistent with disclosed embodiments.

FIG. 3 is a flow diagram illustrating an exemplary electronic communication digest generation process that may be performed by one or more components of the system of FIG. 1. The process may generate an electronic communication digest that distills or summarizes content included in one or more e-mail streams into a format that is easy for a user to comprehend. The process may be performed, e.g., via execution of electronic communication digest generation program 115 of client device 110, consistent with disclosed embodiments. As discussed above, the process will be described herein as being performed by client device 110 and electronic communication digest generation program 115, although those skilled in the art will appreciate that the process may also be performed by server 120 executing electronic communication digest generation program 125 and/or a combination of client device 110 and server 120.

In one embodiment, client device 110 may receive an original electronic communication, such as an e-mail, e.g., from server 120 (Step 310). The original electronic communication may include a unique identifier (e.g., an identifier not shared by other electronic communications). In certain embodiments, server 120 and/or a client-side electronic communication application, such as an e-mail communication may assign the unique identifier to the electronic communication. These devices and applications may define the unique identifier such that any subsequent electronic communication that replies to or forwards the original electronic communication includes an identifier that is identical to the unique identifier of the original e-mail. Thus, using e-mail as an example, a reply e-mail to an original e-mail will include the same identifier as the unique identifier of the original e-mail. Likewise, subsequent e-mails responding to the reply e-mail will also have the same identifier as the unique identifier of the original e-mail, and so on. This way, enable electronic communication digest generation program 115 may be configured to detect related e-mails, even if those e-mails differ with regard to other information, such as subject line, recipients, etc. In certain embodiments, electronic communication digest generation programs 115 and/or 125 may generate unique identifiers and assign them to the electronic communications as they are sent from and received at client device 110. Thus, for example, in embodiments where an electronic communications application on client device 110 or server 120 does not generate and assign unique identifiers, electronic communication digest generation programs 115 and/or 124 may generate and assign them to electronic communications. Moreover, in certain embodiments, electronic digest generation programs 115 and/or 125 may assign the unique identifiers to electronic communications by embedding them in the electronic communication such that it cannot be removed by cleansing software, such as metadata removal software.

Upon receiving the original electronic communication with the unique identifier (or assigning the electronic communication a unique identifier, if it does not have one), electronic communication digest generation program 115 may create an electronic communication digest (Step 320). In certain embodiments an electronic communication digest may be a distillation or summary of the unique content within related electronic communications.

FIG. 4 shows an exemplary electronic communication digest 400 that may be generated by the process of FIG. 3 based on e-mail streams 200 and 201 of FIG. 2. Electronic communication digest generation program 115, when executed by processor 111, may generate a digest entry 410 that reflects e-mail 210. For example, electronic communication digest generation program 115 may generate condensed header information based on header information contained in the original e-mail. For example, FIG. 4 shows such digest entry 410 that may include condensed header information 422 based on header information 222 included in e-mail 210. The condensed header information 422 may provide information such as the sender of the e-mail, the recipients of the e-mail, and the date and time the e-mail was sent, in a condensed format. The condensed format may include a shorthand representation of sender names, recipient names, a date and time an e-mail was sent, etc. For example, the exemplary format of condensed header information 422 as shown in FIG. 4 indicates that the electronic communication represented by digest entry 410 was sent from Sender ("F: S"), sent to Recipient1 and Recipient2 ("T: R1, R2"), and sent on Oct. 2, 2012 at 12:46 pm ("S: 10102112 12:46P"). Of course, this format is exemplary only, and any format may be used.

Program 115 may also generate digest content based on the content of the e-mail. For example, program 115 may generate the digest content by removing or eliminating part of the content of the e-mail, such as salutations, footers and/or headers, privacy notices, and/or other extraneous information. FIG. 4 shows digest entry 410 that includes digest content 423 determined based on content 223 of e-mail 210. In the example of FIG. 4, digest content 423 differs from content 223 in that the salutations have been removed e-mail 210, leaving only the true content of e-mail 210.

Program 115, when executed by processor 111, may generate digest content from content in an e-mail using other techniques. In certain embodiments, the digest content may be identical to the corresponding e-mail content. For example, digest content 425 in digest entry 411 is identical to content 325 in e-mail 311. In other embodiments, electronic communication digest generation program 115 may generate the digest content by eliminating certain words from the unique content in the received e-mail. For example, electronic communication digest generation program 115 may shorten content 221 in e-mail 212 as digest content 421 included in digest entry 412. Electronic communication digest generation program 115 may shorten content in e-mails in this manner, e.g., by comparing words included in the content to a list of words, e.g., stored in database 140 or elsewhere, and eliminating all of the words included in the content of the e-mails that are also included in the list. For example, program 115 may be configured to receive from a user (e.g., an administrator or other user of program 115) one or more words that may be less meaningful to a user than other words, such as certain articles, prepositions and/or prepositional phrases, pronouns, words used with verb participles, etc.

Moreover, communication digest generation program 115 may be configurable by a user such that the techniques used to generate digest content may vary. For example, electronic communication digest generation program 115 may generate an interface that allows a user to adjust settings associated with electronic communication digest generation program's 115 ability to determine whether it generates digest content by removing salutations, eliminating words, etc.

Returning to FIG. 3, client device 110 may receive additional electronic communications and may determine whether a subsequently received electronic communication includes the same identifier as the unique identifier of the electronic communication received in step 310 (Step 330). If it does (Step 330, Yes), then electronic communication digest generation program 115 may extract unique content from the electronic communication (Step 340) and update the electronic communication digest to include the extracted unique content (Step 350). For example, if client device 110 receives e-mail 211 shown in FIG. 2, the e-mail may include header information 224 and content 225 as well as header information 222 and content 223 from e-mail 210. Thus, e-mail 211 may include repeated and/or extraneous information and/or content. When extracting the unique content from e-mail 211, electronic digest generation program 115 may compare the content of e-mail 211, which includes content 225 and content 223 to the content already included in electronic communication digest 400. When doing so, electronic communication digest generation program 115 may shorten content 225 and 223 using the same processes, algorithms, etc., to generate the digest content described above with regard to step 320. For example, electronic communication digest generation program 115, when executed by processor 111, may remove any salutations, footers and/or headers, privacy notices, and/or other extraneous information and/or shorten sentences by removing certain words, if those steps were also performed as a part of step 320. Electronic communication digest generation program 115 may also compare the modified content.

In one aspect, when electronic communication digest generation program 115 compares the content, it may determine that the only new content included in e-mail 211 is content 225, and that content 223 is already included in digest 400. Thus, at step 340, electronic communication digest generation program 115 may add content 225 to digest 400 as digest entry 411. As shown in FIG. 4, digest entry 411 may also include condensed header information, similar to condensed header information 422.

In one embodiment, electronic communication digest generation program 115 may repeat the process of FIG. 3 each time a new electronic communication is received. For example, electronic communication digest generation program 115 may automatically update the electronic communication digest each time an electronic communication is received that is related to the electronic communication received in step 320. Electronic communication digest generation program 115 may determine that electronic communications are related by, for example, determining if they include the same identifier, as discussed above. To continue with the example of e-mail stream 200, e-mail 212 it may include the content of e-mails 211 and 210 that preceded it. Thus, electronic communication digest generation program 115 may detect the content in e-mail 212 that is unique by comparing it to content already contained in the digest. By doing so, it may determine that the only unique content is content 221. Electronic communication digest generation program 115 may add digest entry 412 having digest content 421 based on unique content 221.

In certain aspects, client device 110 may execute electronic communication digest generation program 115 to performed the processes of FIG. 3 to generate digest 400, which may summarize the content of all of the e-mails in e-mail streams 200 and 201. For example, the content of initial e-mail 210 is represented by digest entry 410 at the top of digest 400, while e-mails 211 and 213, which replied to e-mail 210, are represented by digest entries 411 and 413. Likewise e-mails 212 and 214 are represented by digest entries 412 and 414. This way, client device 110 may generate data that is rendered to a user that summarizes the content of multiple e-mails (and potentially multiple e-mail streams) in a single digest. For example, client device 110 may display digest 400 on a display device (not shown).

Figure 5:
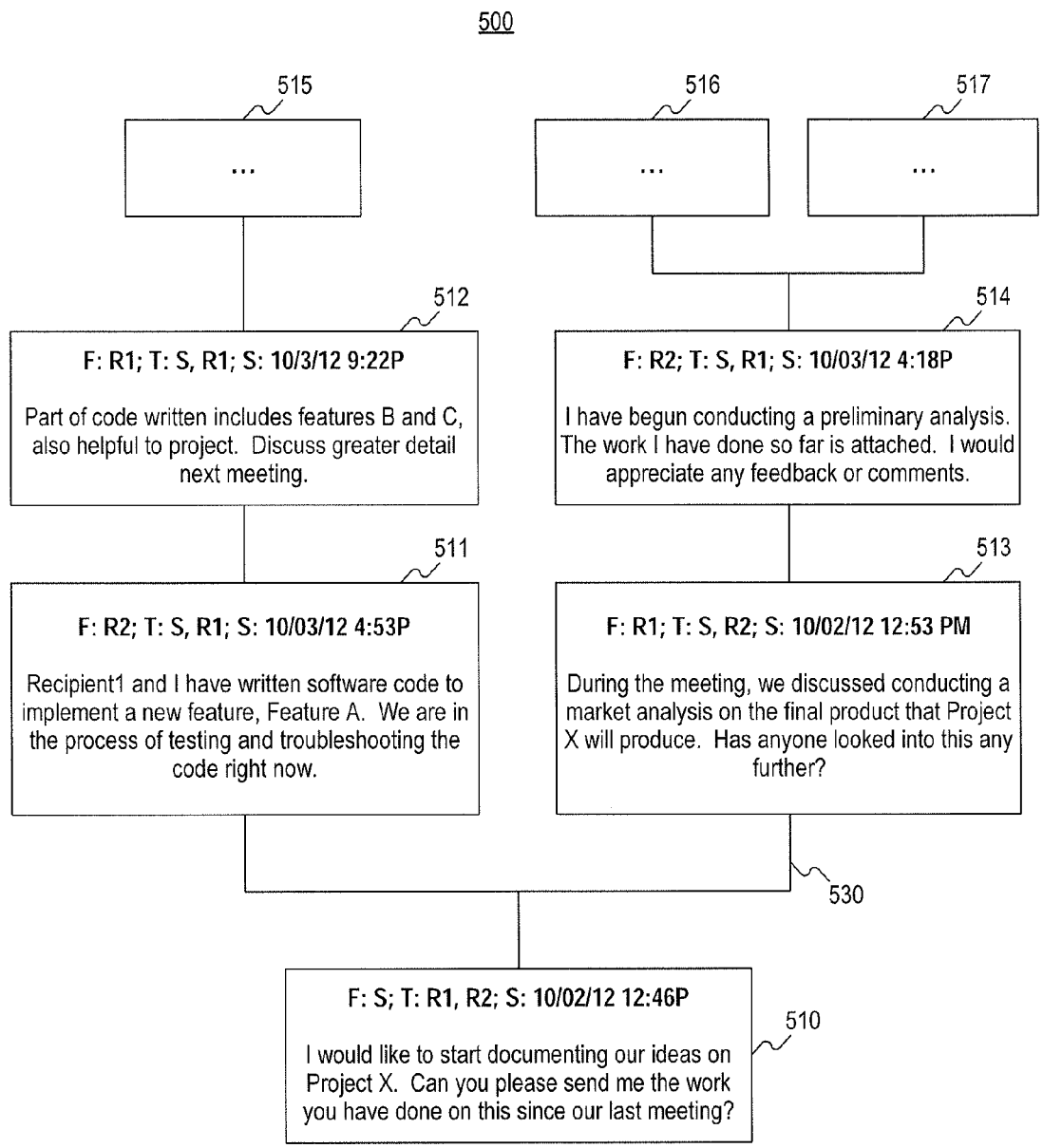
FIGS. 5 and 6 show exemplary graphical diagrams used to represent exemplary electronic communication digests, consistent with disclosed embodiments.
Figure 6:
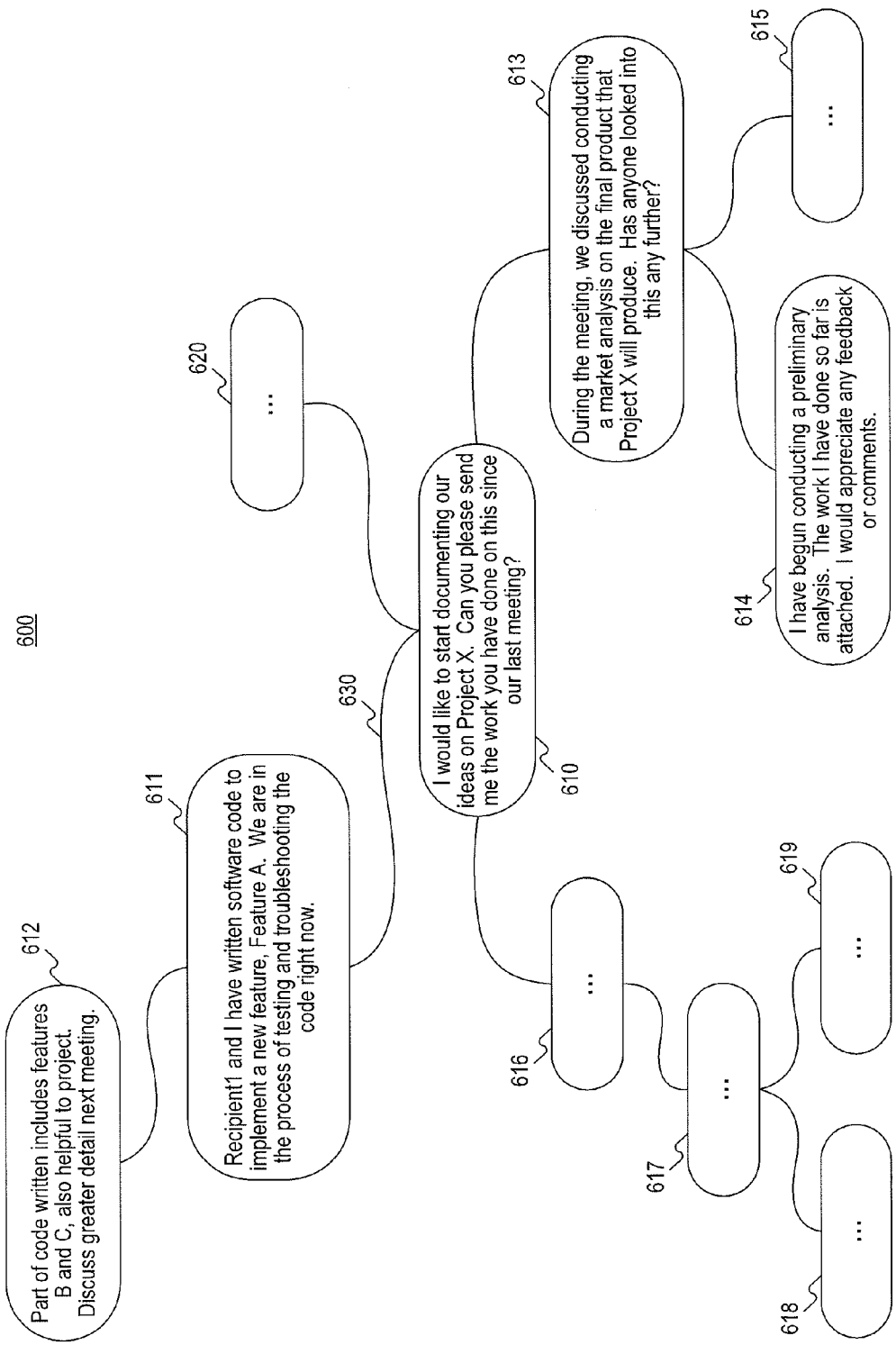

In certain embodiments, electronic communication digest generation program 115 may also generate a graphical representation of the electronic communication digest. Client device 110 may similarly display these graphical representations on a display device (not shown). FIGS. 5 and 6 show exemplary graphical diagrams 500 and 600 that represent exemplary electronic communication digests, consistent with disclosed embodiments. Graphical diagrams 500 and 600 each include nodes representing each representing a digest entry (and thus digest content) as well as links between the nodes that represent a relationship between the digest content included in the nodes connected by each link. Moreover, while graphical diagrams 500 and 600 include one node for each digest entry, in other embodiments graphical diagrams 500 and 600 may include multiple nodes for each digest entry. For example, if a digest entry includes multiple paragraphs or concepts, then the graphical diagram may include a node for each individual paragraph or concept.

In FIG. 5, graphical diagram 500 includes nodes 510, 511, 512, 513, and 514 representing the digest content included in digest entries 410, 411, 412, 413, and 514, respectively. Graphical diagram 500 also includes links, such as link 530, that connect the nodes and represent a relationship between the connected nodes. For example, link 530 represents that the content represented by node 513 was sent in response to the content represented by node 510. Indeed, as discussed above, e-mail 213 (which corresponds to node 513) was sent as a reply to e-mail 210 (which corresponds to node 510).

Graphical diagram 500 also includes nodes 515, 516, and 517 to illustrate how additional electronic communications later received as a part of the same stream, may be represented by aspects of the disclosed embodiments. For example, a client device may have sent an electronic communication having content represented by node 515 in response to the electronic communication with content represented by node 512. Likewise, one or more client devices may have sent electronic communications having content represented by nodes 516 and 517 in response to the electronic communication with content represented by node 514.

FIG. 6 illustrates an alternative graphical diagram 600 for representing a digest. For example, in FIG. 6, the content of the original electronic communication is represented as a central node 610, and other nodes, representing content sent in reply to the original communication, branch out from central node 610 via links such as link 630. These links also represent the relationship between nodes. For example, the content represented by node 612 was sent in response to the content represented by node 611, which was, in turn, sent in response to the content represented by node 610. Similarly, the content in node 614 was sent in response to the content represented by node 613, which was, in turn, sent in response to the content represented by node 610. Nodes 615-620 represent exemplary nodes to illustrate how additional electronic communications may be represented in graphical diagram 600.

In certain embodiments, program 115 may be configured to generate the nodes in graphical diagram 600 to include condensed header information, similar to the condensed header information included in the nodes in graphical diagram 500. Alternatively or additionally, program 115 may generate the nodes of graphical diagrams 500 and 600 to include other visual identifiers to identify the header information of the electronic communications. For example, program 115 may generate graphical diagrams 500 and 600 to include different colors or shading to indicate the sender of the content represented by the node. For instance, nodes representing content sent by Sender may be provided in a first color, and nodes representing content sent by Recipient1 and Recipient2 may be provided in a second and third color, respectively.

In certain embodiments, electronic communication digest generation program 115 may generate a graphical representation of the electronic communication digest, such as graphical representation 500 and/or 600, each time an electronic communication digest is created or updated, e.g., as a part of the process of FIG. 3. Thus, electronic communication digest generation program 115 may automatically generate a new node and link corresponding to the received electronic communication, and may automatically add the new node and link to the graphical diagram based on a relationship between the new node and existing nodes in the graphical diagram. This way, the graphical diagram may be updated each time a related electronic communication is received.

In some embodiments, program 115 may generate the nodes within a graphical representation to contain embedded links to the underlying electronic communication represented by the nodes. Using graphical representation 600 as an example, a user may select node 610, e.g., via a user interface displayed on client device 110. Responsive to the selection, client device 110 may display e-mail 210, the content of which is represented by node 610, via the user interface.

Figure 7:
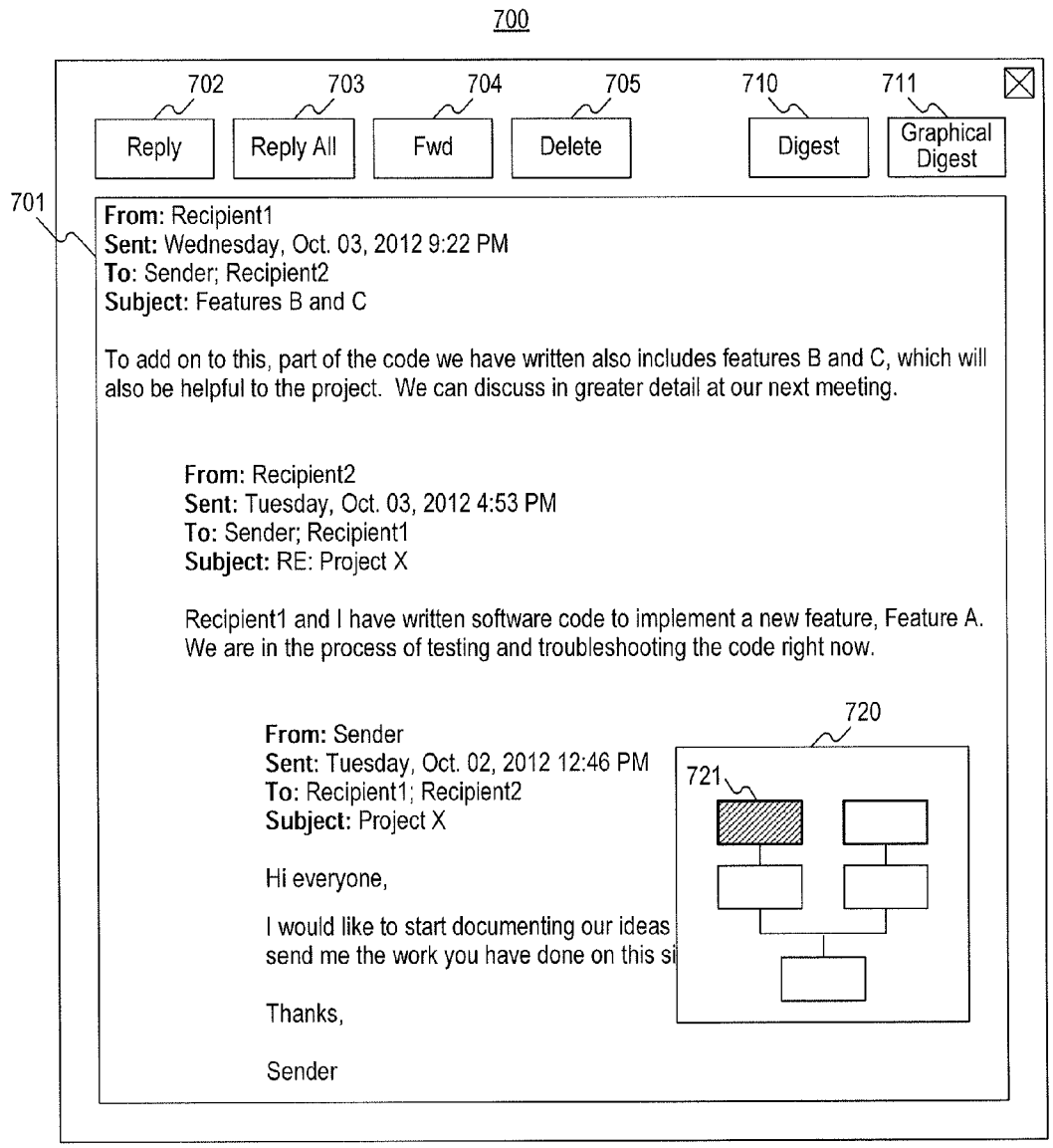
FIG. 7 shows an exemplary user interface for displaying an e-mail and a corresponding electronic communication digest, consistent with disclosed embodiments.

FIG. 7 shows an exemplary user interface 700 for viewing an e-mail and an electronic communication digest, consistent with disclosed embodiments. User interface 700 may be displayed, for example, on a display device of client device 110, e.g., as part of a client-side e-mail application or in a web browser communicating with a server-side e-mail application. User interface 700 may display a received e-mail 701 along with icons for generating e-mail commands, such as a "Reply" icon 702, "Reply All" icon 703, "Fwd" icon 704, and "Delete" icon 705. These icons may correspond to the traditional e-mail functions as replying to an e-mail, replying to all recipients on an e-mail, forwarding an e-mail, or deleting an e-mail.

User interface 700 may also include a "Digest" icon 710 and a "Graphical Digest" icon 711. In certain embodiments, responsive to a user selecting "Digest" icon 710 or "Graphical Digest" icon 711, window 720 may appear, displaying the digest (if "Digest" icon 710 was selected) or the graphical representation of the digest (if "Graphical Digest" icon 711 was selected). For example, a graphical representation is currently displayed in window 720. Window 720 may also include an indication 721 of the relative location of the currently view e-mail within the graphical representation (or within the digest, if "Digest" icon 710 was selected). For example, e-mail 701 corresponds to e-mail 212 shown in FIG. 2, which also corresponds to node 512 in graphical representation 500 of FIG. 5. Thus, indication 721 illustrates the position of node 512 within graphical representation 500.

In other embodiments, window 720 may be displayed without the user having to select one of icons 710 and 711. That is, each time an e-mail is opened by a user, window 720 may automatically appear, displaying one or more of the digest or the graphical representation of the digest corresponding to that e-mail. In any of these embodiments, if a user selects window 720, e.g., by clicking it, window 720 may be enlarged to allow the user to view the digest or graphical representation in more detail, e.g., as shown in FIGS. 4-6.

Figure 8:
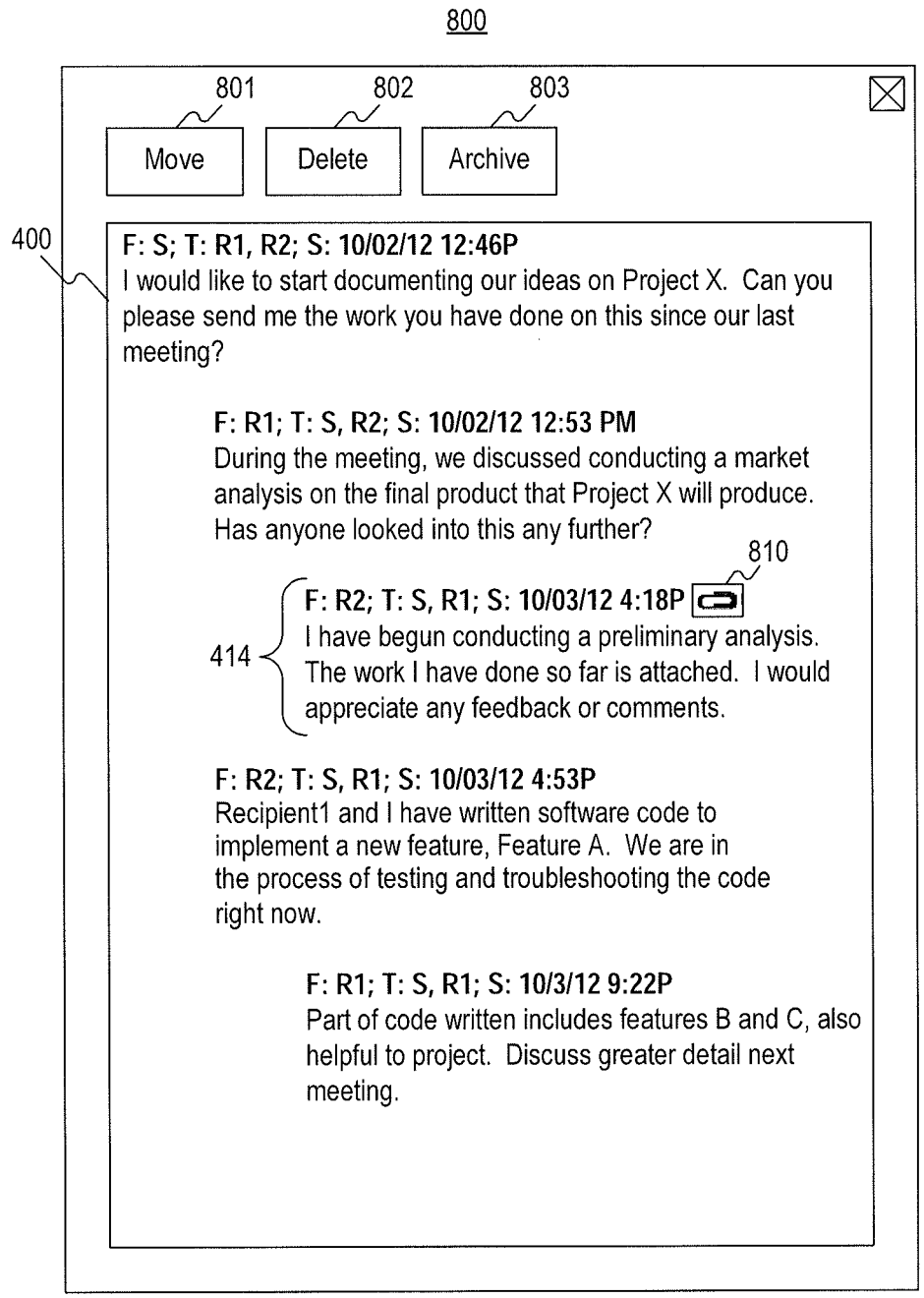
FIG. 8 shows an exemplary user interface for displaying an electronic communication digest, consistent with disclosed embodiments.

FIG. 8 shows an exemplary user interface 800 for displaying an electronic communication digest, consistent with disclosed embodiments. For example, user interface 800 includes electronic communication digest 400 as well as "Move" icon 801, "Delete" icon 802, and "Archive" icon 803. These icons may enable a user to command client device 110 or server 120 to perform a particular command on all of the electronic communications represented by the electronic communication digest with a single action. For example, if a user selects "Delete" icon 802, each electronic communication represented by digest 400 may be deleted. In this case, the user may be presented with a confirmation window to confirm that the user really wants to delete all of the related electronic communications. The user may also be presented with an option of saving the electronic communication digest itself, while deleting all of the electronic communications corresponding to it. This way, the user may maintain a summarized digest of the unique content in the electronic communication stream without having to maintain each individual electronic communication in the stream. Likewise, by selecting "Move" icon 801 or "Archive" icon 803, the user can chose to move all of the electronic communications represented by the digest to a particular location or archive the electronic communications.

User interface 800 also includes an attachment icon 810 associated with digest entry 414. As shown in digest entry 414, Recipient2 indicated that an attachment was included in e-mail 214. Thus, attachment icon 810 may provide a link to the attachment in e-mail 214, which is represented by digest entry 414. If the user selects attachment icon 810 via user interface 800, the user may be allowed to download and/or view the attachment included in e-mail 214.

Figure 9:
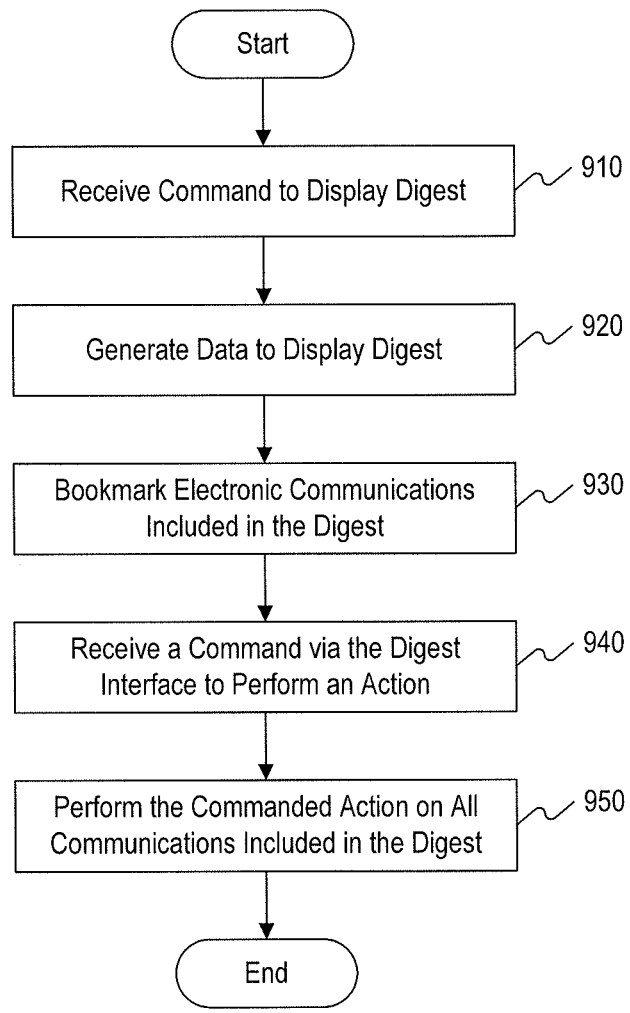
FIG. 9 is a flow diagram illustrating an exemplary process for performing commands on electronic communications represented by an electronic communication digest.

FIG. 9 is a flow diagram illustrating an exemplary process for performing commands on electronic communications represented by an electronic communication digest. For example, electronic communication digest generation program 115 may receive a command to display an electronic communication digest (Step 910). The command may be received, e.g., by a user interface, such as user interface 700 of FIG. 7. In response to the command, electronic communication digest generation program 115 may generate data to display the electronic communication digest (Step 920). For example, the electronic communication digest may be displayed via user interface 800 of FIG. 8.

Electronic communication digest generation program 115 may also bookmark the electronic communications that are represented by the electronic communication digest being displayed, and may associated the electronic communications with the electronic communication digest (Step 930). This way, when a command is received via user interface 800, the command may be performed on all of the electronic communications represented by the electronic communication digest.

Electronic communication digest generation program 115 may receive a command, e.g., via user interface 800, to perform a particular action (Step 940). For example, a user may select "Delete" icon 801, which may generate a command that is sent to electronic communication digest generation program 115.

Responsive to receiving the command, electronic communication digest generation program 115 may perform the commanded action on all communications included in the electronic communication digest (Step 950). Thus, continuing with the "Delete" icon 801 example, electronic communication digest generation program 115 may delete all of the bookmarked electronic communications that were represented by electronic communication digest 400. This way a user can perform the same actions to all electronic communications included in an electronic communication digest with a single command.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Additionally, although disclosed aspects are described as being stored in a memory on a computer, one skilled in the art will appreciate that these aspects can also be stored on other types of tangible computer-readable media, such as secondary storage devices, like hard disks, floppy disks, a CD-ROM, or other forms of RAM or ROM.

Computer programs based on the written description and disclosed methods are within the capabilities of one of ordinary skill in the art. The various programs or program modules can be created using any of the techniques known to one skilled in the art or can be designed in connection with existing software. For example, program sections or program modules can be designed in or by means of DirectX, .Net Framework, .Net Compact Framework, Visual Basic, C, XML, Java, C++, JavaScript, HTML, HTML/AJAX, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A system for creating an electronic communication digest, comprising:
    a processor; and
    a memory coupled to the processor, the memory storing instructions to direct the processor to perform operations comprising:
        generating first digest content based on content of a first electronic communication;
        generating an electronic communication digest that includes the first digest content;
        generating second digest content based on content of a subsequent second electronic communication;
        analyzing content of the second digest content to identify a repeated portion that is included in both the first electronic communication and the second electronic communication;
        determining a unique portion that is included in the second electronic communication and is not included in the first electronic communication;
        updating the electronic communication digest to include the unique portion; and
        generating data to display an interface including the electronic communication digest.

2. The system of claim 1, the operations further comprising:
    automatically updating the electronic communication digest each time a new electronic communication related to the first electronic communication is received to reflect the newly received electronic communication.

3. The system of claim 1, wherein at least one of the content of the first electronic communication or the content of the second electronic communication includes electronic text.

4. The system of claim 1, the operations further comprising:
    generating the data to display the electronic communication digest as a graphical diagram, the graphical diagram including:
        a first node representing the first digest content,
        a second node representing the second digest content, and
        a link between the first node and the second node representing a relationship between the first digest content and the second digest content.

5. The system of claim 4, the operations further comprising:
    automatically generating a new node and a new link each time a new electronic communication related to the first electronic communication is received; and
    automatically adding the new node and the new link to the graphical diagram based on a relationship between the new electronic communication and other electronic communications represented by existing nodes in the graphical diagram.

6. The system of claim 4, the operations further comprising:
    receiving a selection of a node that represents an electronic communication; and
    displaying the electronic communication represented by the node responsive to receiving the selection.

7. The system of claim 1, the operations further comprising:
    receiving a command to perform an action; and
    performing the commanded action on one or more of the electronic communications represented by the electronic communication digest,
    wherein the commanded action includes at least one from the group consisting of moving, copying, archiving, and deleting the one or more electronic communications represented by the electronic communication digest.

8. The system of claim 1, the operations further comprising:
    generating data to display an interface including the second electronic communication;
    receiving, via the interface including the second electronic communication, a command to view the electronic communication digest; and
    generating, responsive to the received command, data to display the electronic communication digest.

9. The system of claim 1, the operations further comprising selectively including second digest content in the electronic communication digest based on a comparison of the second digest content to one or more predetermined words.

10. The system of claim 9, wherein the predetermined one or more words are included in a list of words accessed by the processor, the list of words including articles or phrases that are to be excluded from the electronic communication digest.

11. The system of claim 1, the operations further comprising:
    determining that the second electronic communication is related to the first electronic communication responsive to determining that an identifier of the second electronic communication is identical to a unique identifier of the first electronic communication.

12. A computer-implemented method for creating an electronic communication digest, comprising:
    generating first digest content based on content of a first electronic communication, generating, by one or more processors, an electronic communication digest that includes the first digest content;

analyzing content of a subsequent second electronic communication to identify a repeated portion that is included in both the first electronic communication and the second electronic communication;

determining a unique portion that is included in the second electronic communication and is not included in the first electronic communication;

generating second digest content based on the unique portion;

updating the electronic communication digest to include the second digest content; and generating data to display an interface including the electronic communication digest.

13. The computer-implemented method of claim 12, further comprising:
automatically updating the electronic communication digest each time a new electronic communication related to the first electronic communication is received to reflect the newly received electronic communication.

14. The computer-implemented method of claim 12, wherein at least one of the content of the first electronic communication or the content of the subsequent second electronic communication includes electronic text.

15. The computer-implemented method of claim 12, further comprising:
generating the data to display the electronic communication digest as a graphical diagram, the graphical diagram including:
a first node representing the first digest content,
a second node representing the second digest content, and
a link between the first node and the second node representing a relationship between the first digest content and the second digest content.

16. The computer-implemented method of claim 15, further comprising:
automatically generating a new node and a new link each time a new electronic communication related to the first electronic communication is received; and
automatically adding the new node and the new link to the graphical diagram based on a relationship between the new electronic communication and other electronic communications represented by existing nodes in the graphical diagram.

17. The computer-implemented method of claim 15, further comprising:
receiving a selection of a node that represents an electronic communication; and
displaying the electronic communication represented by the node responsive to receiving the selection.

18. The computer-implemented method of claim 12, further comprising:
receiving a command to perform an action; and
performing the commanded action on one or more of the electronic communications represented by the electronic communication digest,
wherein the commanded action includes at least one from the group consisting of moving, copying, archiving, and deleting the one or more electronic communications represented by the electronic communication digest.

19. The computer-implemented method of claim 12, further comprising:
generating data to display an interface including the second electronic communication;
receiving, via the interface including the second electronic communication, a command to view the electronic communication digest; and
generating, responsive to the received command, data to display the electronic communication digest.

20. The computer-implemented method of claim 12, further comprising selectively including second digest content in the electronic communication digest based on a comparison of the second digest content to one or more predetermined words.

21. The computer-implemented method of claim 20, wherein the predetermined one or more words are included in a list of words accessed by the processor, the list of words including articles or phrases that are to be excluded from the electronic communication digest.

22. The computer-implemented method of claim 12, further comprising:
determining that the second electronic communication is related to the first electronic communication responsive to determining that an identifier of the second electronic communication is identical to a unique identifier of the first electronic communication.

23. A non-transitory computer readable medium storing instructions which, when executed by one or more processors, direct the one or more processors to perform operations comprising:
generating an electronic communication digest that includes digest content representing content of a first electronic communication;
receiving a plurality of subsequent electronic communications that are related to the first electronic communication, each related electronic communication including content;
for each subsequent electronic communication:
analyzing the content of the subsequent electronic communication to identify a repeated portion that is included in both the first electronic communication and the subsequent electronic communication;
determining a unique portion that is included in the subsequent electronic communication and is not included in the first electronic communication;
adding the unique portion to the electronic communication digest; and
generating data to display an interface including the electronic communication digest.

24. The system of claim 23, the operations further comprising selectively including second digest content in the electronic communication digest based on a comparison of the second digest content to one or more predetermined words.

25. The computer-implemented method of claim 24, wherein the predetermined one or more words are included in a list of words accessed by the processor, the list of words including articles or phrases that are to be excluded from the electronic communication digest.

* * * * *